Aug. 26, 1924.
J. D. TYLER
1,506,695
INTERNAL COMBUSTION ENGINE FUEL HEATER
Filed March 9, 1923
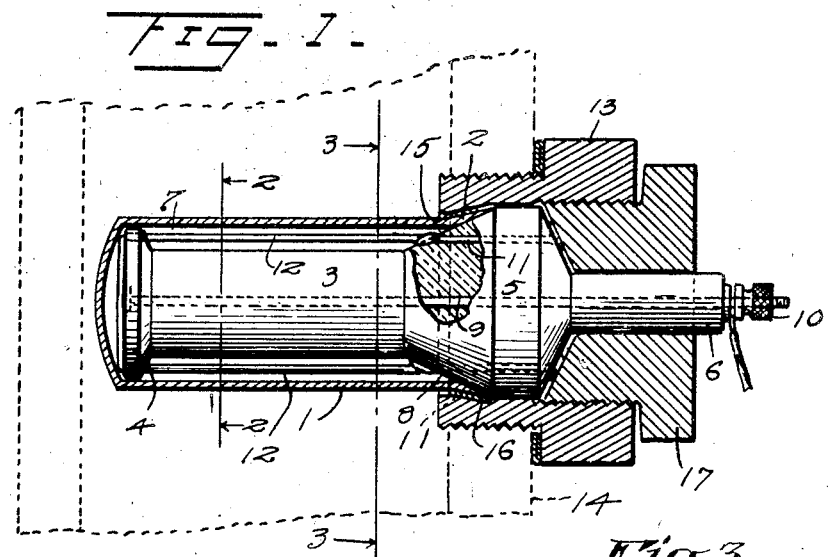
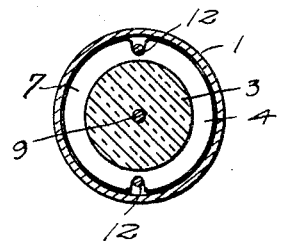
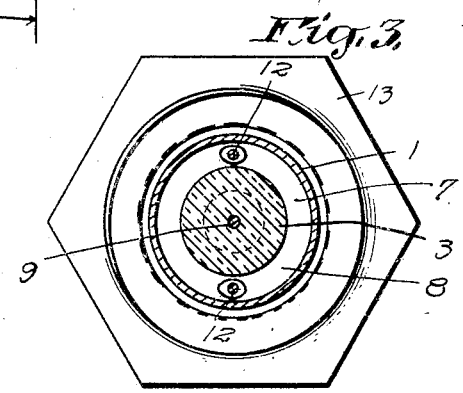
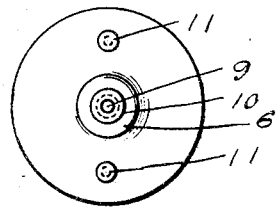
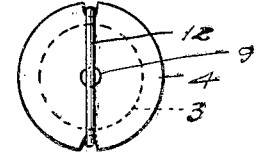
Inventor
J. D. Tyler.

Patented Aug. 26, 1924.

1,506,695

UNITED STATES PATENT OFFICE.

JOHN D. TYLER, OF CLARKSVILLE, TENNESSEE.

INTERNAL-COMBUSTION-ENGINE-FUEL HEATER.

Application filed March 9, 1923. Serial No. 624,059.

*To all whom it may concern:*

Be it known that I, JOHN D. TYLER, a citizen of the United States, residing at Clarksville, in the county of Montgomery and State of Tennessee, have invented certain new and useful Improvements in Internal-Combustion-Engine-Fuel Heaters; and I do hereby declare the following to be a full, clear, and exact description of the invention, such as will enable others skilled in the art to which it appertains to make and use the same.

The invention has for its primary object to conserve fuel in the operation of internal combustion engines and to facilitate the starting of the same in cold weather, this being effected by the heating of the fuel prior to its entrance into the cylinders of the engine and in accordance with the present invention an electric heater of unique structural formation is located in the length of the intake manifold.

A further object of the invention is the provision of a heater which may be easily and quickly dismembered and reassembled, thereby adapting the same to meet varying conditions and also to provide a heater which will utilize a minimum amount of current and utilize a maximum percentage of heat units in raising the temperature of the fuel.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a central longitudinal section of a fuel heater embodying the invention, the dotted lines indicating a portion of the intake manifold of an internal combustion engine, Figure 2 is a sectional view on the line 2—2 of Figure 1, looking to the left as indicated by the arrows, Figure 3 is a similar view on the line 3—3 of Figure 1, looking to the right as indicated by the arrows, Figure 4 is a view of the inner end of the core, and Figure 5 is a view of the outer end of the core.

Corresponding and like parts are referred to in the following description and designated in the several views of the drawings by like reference characters.

The heater comprises a metal shell 1, preferably of cylindrical form and of copper, said shell being closed at its inner end and open at its outer end, the latter being flared, as indicated at 2. A core 3 of insulating material, such as porcelain, is removably fitted in the shell 1 and has an outer flange 4 at its inner end and an enlargement or head 5 at its outer end from which a stem 6 projects. That portion of the core comprised between the flange 4 and head 5 is of such diameter as to leave an annular space 7 between it and the inner wall of the shell 1 when the core is in place within the shell. The inner or rear face of the enlargement or head 5 is inclined, as indicated at 8, and receives the flared portion 2 of the shell 1. A conductor 9 is located centrally within the core 3 and is provided at its outer end with a binding post 10 for attachment of the lead wire thereto. Other conductors 11 are disposed within the outer portion of the enlargement or head 5 and projects beyond opposite sides or faces thereof. A resistance wire 12 forming a heating element is electrically connected at opposite ends with the conductors 9 and 11 and is equally spaced from the shell 1 and core 3 to admit of utilizing all or nearly all the units of heat developed by the passage of the current through the resistance 12. As shown most clearly in Figures 1 and 4, a portion of the heating element 12 extends across the inner end of the core, thereby serving to heat the inner end of the shell. The heating element may comprise portions which are grouped about the core, said parts being supported at one end by the outer flange 4 and at the opposite end by the enlargement or head 5, thereby spacing the portions intermediate the elements 4 and 5 both from the core and the shell. The outer edge of the flange 4 is notched to receive the parts comprising the heating element. A hollow nut 13 has its inner end reduced and externally screw threaded to make connection with the intake manifold 14 and this threaded portion is constricted and tapered, as indicated at 15, so as to clamp the flared portion 2 of the shell 1 between it and the tapered portion 8 of the enlargement or head 5 of the core. Suitable packing 16 is interposed between the parts 2 and 15 to insure the formation of a tight joint and operate as a cushion to prevent injury to the core, and as an insulating element between the copper shell and other metal parts which would tend to conduct the heat out of the shell. A gland or jam nut 17 threaded into the outer end of the hollow nut 13 serves to secure the parts when assembled and the stem 6 passes therethrough. The outer ends of the conductors 11 are adapted to make electric connection with the gland 17, thereby grounding the heating element 12 through the nut 13 and manifold 14.

What is claimed is:

1. An electric heater comprising a metallic shell open and flared at one end, a core of insulating material removably fitted within the shell and having outer enlargements in its length with the parts comprised between such enlargements spaced from the shell and core, the enlargement at the outer enlargements in spaced relation from the shell and core, the enlargements at the outer end of the core having its rear face tapered to conform to the flare at the open end of the shell, a hollow nut receiving the shell and core and having an end constricted and tapered to conform to the flare of the shell, and a jam nut for securing the core and shell within the hollow nut.

2. An electric heater comprising a metallic shell open and flared at one end, a core of insulating material having an outer flange at one end, and a head and stem at the opposite end, the rear face of the head being tapered, a conductor within the core and projecting beyond the ends thereof, other conductors within the outer portion of the head and projecting beyond opposite sides thereof, a resistance element extending across the inner end of the core and along the sides thereof and spaced from the shell and core by the outer flange and head of the latter, said resistance element being electrically connected with the inner ends of the conductors, a hollow nut having an end portion constricted and tapered to conform to the flared end of the shell and tapered side of the head, and a jam nut securing the core and shell to each other and within the hollow nut.

3. An electric heater comprising a metallic shell open and flared at one end, a core of insulating material removably fitted within the shell and having outer enlargements in its length with the parts comprised between the enlargements spaced from the shell, a resistance element supported by said enlargements in spaced relation from the shell and core, the enlargement at the outer end of the core having its rear face tapered to conform to the flare at the open end of the shell, means engaging the flared end of the shell, and means engaging said means and coacting therewith to hold the core within the shell.

4. An electric heater comprising a metallic shell open and flared at one end, a core of insulating material removably fitted within the shell and having outer enlargements in its length with the parts comprised between the enlargements spaced from the shell, an electrode embedded in said core and extending beyond each end thereof, a resistance element supported by said enlargements in spaced relation from the shell and core, said resistance element connected with the inner end of said electrode, the enlargement at the outer end of the core having its rear face tapered to conform to the flare at the open end of the shell, said resistance element passing through the enlargement at the outer end of the core, means engaging the flared end of the core, and means engaging said means and coacting therewith to hold the core within the shell, said second named means engaging the ends of the resistance element at the outer face of the enlargement through which they pass, whereby the resistance element will be grounded when the device is in operative position.

In testimony whereof I affix my signature in presence of two witnesses.

JOHN D. TYLER.

Witnesses:
A. R. GHOLSON,
W. E. GREENHILL.